United States Patent [19]

Pfeiffer et al.

[11] Patent Number: 5,725,710
[45] Date of Patent: Mar. 10, 1998

[54] PRODUCTION OF FIBER-REINFORCED COMPOSITES BY PULTRUSION WITH THERMOPLASTIC POWDER PRETREATMENT

[75] Inventors: Bernhard Pfeiffer, Kelkheim; Detlef Skaletz, Mainz; Horst Heckel, Darmstadt, all of Germany; Anne Texier, Lille, France; Joachim Heydweiller, Rüsselsheim, Germany

[73] Assignee: Hoechst Aktiengesellschaft, Frankfurt, Germany

[21] Appl. No.: 595,447

[22] Filed: Feb. 5, 1996

Related U.S. Application Data

[63] Continuation of Ser. No. 280,498, Jul. 26, 1994, abandoned.

[30] Foreign Application Priority Data

Jul. 28, 1993 [DE] Germany .................. 43 25 260.5

[51] Int. Cl.⁶ .................. B29C 70/00; B29C 70/18
[52] U.S. Cl. .................. 156/180; 156/166; 264/136; 427/407.3; 427/434.6
[58] Field of Search .................. 156/166, 180, 156/181, 245, 500, 242; 264/136; 118/420; 427/434.6, 434.7, 203, 407.3

[56] References Cited

U.S. PATENT DOCUMENTS

| | | |
|---|---|---|
| 3,470,051 | 9/1969 | Meyer . |
| 4,680,224 | 7/1987 | O'Connor .................. 427/430.1 X |
| 4,743,413 | 5/1988 | Galichon . |
| 4,783,349 | 11/1988 | Cogswell et al. .................. 427/407.3 |
| 4,792,481 | 12/1988 | O'Connor .................. 427/393.5 X |
| 4,988,278 | 1/1991 | Mills .................. 156/500 X |
| 5,019,427 | 5/1991 | Soules .................. 118/420 X |
| 5,094,883 | 3/1992 | Muzzy et al. .................. 427/434.6 X |
| 5,114,516 | 5/1992 | Pilling et al. .................. 156/166 X |
| 5,205,898 | 4/1993 | Wilson .................. 156/181 X |
| 5,336,526 | 8/1994 | Spoo et al. .................. 427/385.5 X |

FOREIGN PATENT DOCUMENTS

| | | |
|---|---|---|
| 0368412 | 5/1990 | European Pat. Off. . |
| 0 274 464 | 9/1990 | European Pat. Off. . |
| 0455149 | 11/1991 | European Pat. Off. . |
| 0 056 703 | 5/1992 | European Pat. Off. . |
| 0 415 517 | 8/1993 | European Pat. Off. . |
| A-41 21 915 | 10/1993 | Germany . |

*Primary Examiner*—Jeff H. Aftergut
*Attorney, Agent, or Firm*—Curtis, Morris & Safford, P.C.

[57] ABSTRACT

To produce fiber-reinforced composites, a continuous fiber strand is pulled through an agitated aqueous thermoplastic powder dispersion via deflectors. Following removal of the water phase the thermoplastic powder is heated and melted onto the fibers. Finally the fiber strand is impregnated with a thermoplastic melt by melt pultrusion.

20 Claims, 1 Drawing Sheet

PRODUCTION OF FIBER-REINFORCED COMPOSITES BY PULTRUSION WITH THERMOPLASTIC POWDER PRETREATMENT

This application is a continuation of application Ser. No. 08/280,498, filed Jul. 26, 1994 now abandoned.

FIELD OF THE INVENTION

The invention relates to a process for producing fiber-reinforced composites with constant fiber content.

BACKGROUND OF THE INVENTION

Fiber-reinforced composites are known to be produced by melt pultrusion processes.

In melt pultrusion, a fiber strand is pulled through a thermoplastic melt and becomes wetted with the molten matrix polymer. Postforming or stripping means (nip, die, etc.) are used to set the fiber content.

Owing to the high viscosity of thermoplastic melts, incomplete penetration of the fiber strand may occur (long flow paths within the strand). To achieve adequate penetration of the fiber strand by melt, the commonly used pultrusion processes spread out or open the sized fiber strand before entry into the impregnating tool, or within the tool, by suitable thermal or predominantly mechanical means.

In the process of EP-B-0 056 703, the fiber strand is opened by means of fiber pre-tension by simultaneous guiding over rods for deflection. This can lead to fiber damage or breakage in the case of high pre-tension. The resulting fiber dust causes contamination of the pultrusion tool and the build-up of fiber fragments frequently gives rise, in continuous processes, to strand breakage.

In the process of EP-B-0 415 517, the impregnation of the strand is improved by forcing the polymer melt through the strand. In this case, too, strand opening is due to a mechanical force which inevitably also leads to fiber damage. There also exist completely different processes for producing fiber composites.

According to EP-B-0 274 464, fiber strands are treated using dispersions containing polymer powder dispersed in liquid or solid phase. The particles are sprayed as a jet at a certain angle onto the reinforcing fibers. This causes the fiber strand to spread out. As the strand widens, the fiber is coated with the treatment agent from both sides.

In a process described in DE-A-4 121 915, a liquid polymer powder dispersion is used for impregnating the fiber strand. The thermoplastic powder is applied to the fiber strand moving in longitudinal direction through the powder dispersion, the dispersing medium is removed from this strand, for example by heating, then the thermoplastic is melted, and the composite is consolidated, for example by rolling.

In these processes, the deposition of constant quantities of powder on the fiber strand moving through the dispersion bath presents problems. The polymer content of the composite depends on the solids content of the dispersion bath. The concentration in the immediate vicinity of the strand fluctuates and does not always correspond precisely to the average concentration of the subsequently supplied dispersion. These fluctuations in the amount of thermoplastic on the fiber strand occur in particular at high solids contents of the coating bath. They are very unfavorably noticeable in the end product, since they affect the fiber content and the precise dimensions of the composites produced.

A remedy proposed by U.S. Pat. No. 4,626,306 is to guide the powder-laden fiber strand emerging from the dispersion bath through a roll nip in order that excess polymer powder may be squeezed out of the strand together with the dispersing medium. However, there is a danger here of the fiber being damaged, in which case broken filaments can form wraps on the calibrating rolls.

According to U.S. Pat. No. 4,680,224, the fiber strand loaded with powder is calibrated in a heated die. Fiber breakage occurs in the die, maximum pull-off speeds of 30.5 cm/min are achieved. Fiber contents above 45% by volume are known from experience to lead to strand breakage when the die is used.

In the abovementioned process of DE-A-4 121 915, the thermoplastic content of the fiber-reinforced composite is kept constant by determining the thermoplastic content of the fiber strand emerging from the dispersion bath by measuring its width and using this thermoplastic content to regulate the solids content of the dispersion bath. In a multi-strand system, different strands being coated in the same bath can have different exit widths. However, only the integral bath concentration can be regulated. The disadvantage is thus that the total thermoplastic content has to be applied in the bath and regulated there. A further disadvantage of impregnating with powder dispersions is the high consumption of—compared with granules—usually significantly more costly thermoplastic powders.

SUMMARY OF THE INVENTION

It is an object of the present invention, in the production of fiber-reinforced composites, to achieve a fiber-preserving opening of the fiber strand while at the same time ensuring a constant fiber content.

This object is achieved according to the invention by pulling the fiber strand initially through an agitated aqueous thermoplastic powder dispersion via deflectors, removing the dispersing medium, melting the thermoplastic powder onto the fibers, and subsequently impregnating the fiber strand with additional thermoplastic material in a melt pultrusion. In this process, the fiber strand is pulled through the thermoplastic powder dispersion at a speed of at least 3 m/min. More than 90% of the impregnation of the fiber strand with polymers is effected in the melt pultrusion.

DESCRIPTION OF THE INVENTION

Figure 1:
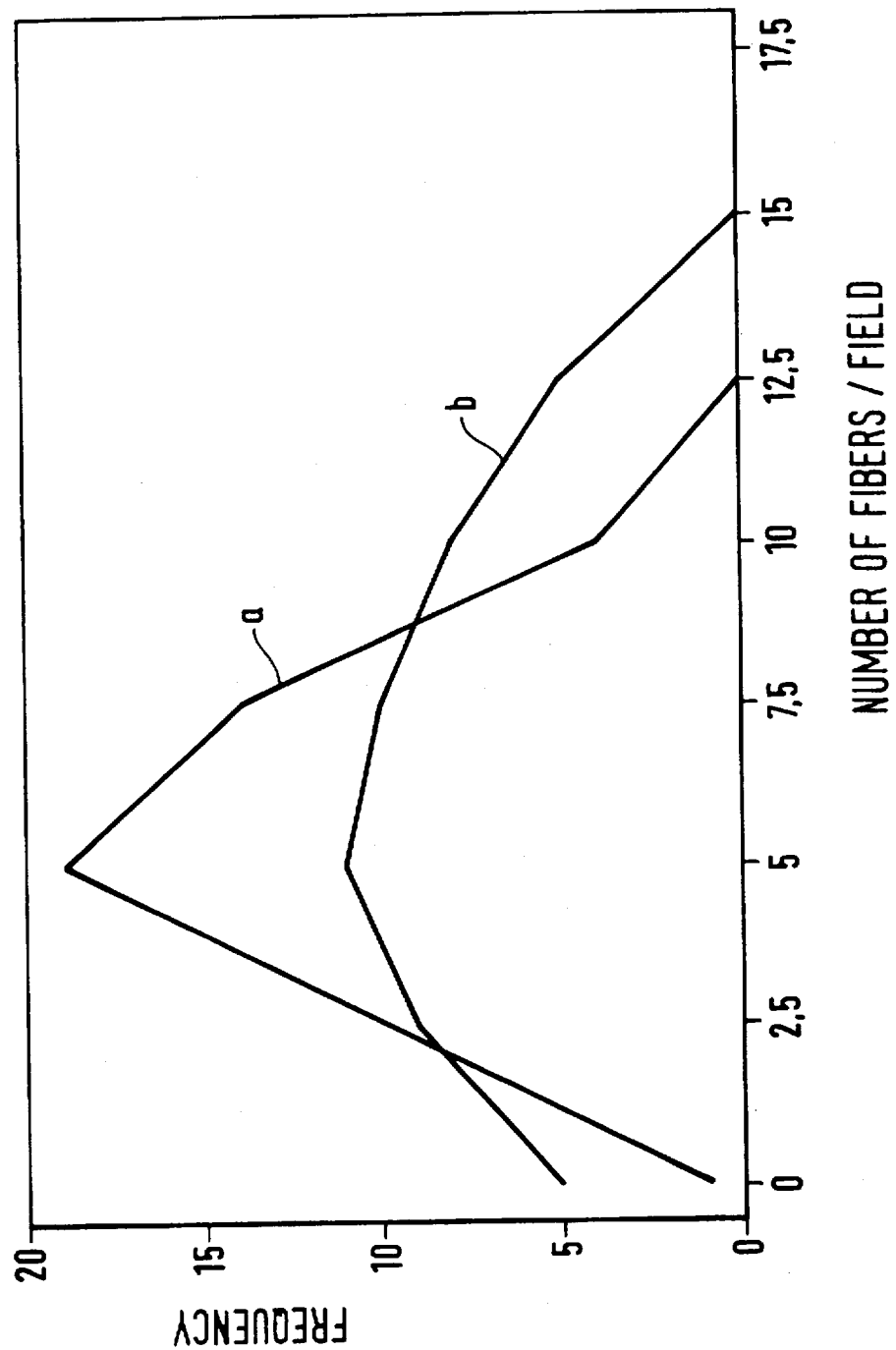
FIG. 1 illustrates a plot (a) which shows the distribution of the fibers in a cross section of a fiber strand after subsequent melt pultrusion. Plot (b) shows the distribution of the fibers without the pretreatment set forth in the present invention (comparative experiment).

The advantages achieved with the process of the invention are that, in contradistinction to melt pultrusion without a pretreatment step, the preimpregnation of fiber strands through deposition of powders from dispersions makes possible a gentle opening of the fiber strand. This avoids fiber damage and the action of mechanical forces to achieve spreading out.

In the subsequent step of melt pultrusion, the powder grains between the filaments of She preconsolidated fiber strand preserve the spread-out. So there is no need for high mechanical forces to spread out the fiber. The powder-laden fiber strand is more robust to mechanical effects on entry into the pultrusion tool.

The pretreatment makes possible not only the improvement in the product quality due to lower fiber damage and better impregnation of each individual fiber of the fiber strand but also an increase in the line speed, since in the known pultrusion processes the production speed is limited by the strand opening. Productivity is additionally increased as a consequence of the fact that, in continuous operation, strand breakage due to build-up of fiber dust and blockage of the pultrusion tool becomes a rarer event. Further advantages of the process according to the invention are the low consumption of thermoplastic powder, since the impregnation of the fiber strand is effected predominantly in the melt pultrusion using polymer granules. At the same time, a constant fiber content is achieved.

This process makes it possible to produce a very wide range of fiber composites from thermoplastics. This includes the possibility of using different polymers. The fiber composites obtained can be used as semi-fabricate for filament winding, laminating, etc., as well as cut material for plasticating/pressing, blow forming and injection molding. There are particular advantages when the product is used as profile without an additional processing step.

It is possible to use thermoplastics in the widest sense, i.e. materials which are reversibly or transiently thermoplastic. The matrix polymer must have a lower softening or melting point than the material of the reinforcing fibers.

The thermoplastics can be in the form of homopolymers, in the form of copolymers, e.g. random copolymers, block polymers, or in the form of polyblends.

The fiber contents vary within the range from 10 to 75% by volume. The process of the invention is illustrated by the examples which follow.

EXAMPLE 1

Three 1200 tex carbon fiber strands of a commercial type with a filament diameter of 10 micrometers were pulled at a speed of 3.2 m/min through an aqueous thermoplastic powder dispersion. The powder had a particle size below 20 micrometers. The fiber strands were guided over 5 pins. The total angle of deflection of each fiber strand was 250°. Sedimenting of the dispersion was prevented by mechanical stirring. Additionally, agglomerates were destroyed using ultrasound.

The dispersion was prepared from 2 l of water, 950 g of a commercial polyphenylene sulfide with the addition of 8 ml of a customary nonionic surfactant and diluted 1:4. The solids content was about 6% by weight.

To remove the dispersing medium, each fiber strand was blown off and dried in a three-zone drying oven at 450°/250°/250° C. in a countercurrent air stream with the powder being melted onto the fibers. Various samples were treated with 86% strength $HNO_3$ to dissolve out the PPS and so determine the fiber content at about 93 to 97% by weight. This process opened the fiber strands gently from an inlet width of 4 to 6 mm to an outlet width of 25 to 35 mm and produced a favorable fiber distribution. FIG. 1, curve a) shows the distribution curve of the fibers in a cross section of a fiber strand after subsequent melt pultrusion. Curve b) shows the distribution of the fibers without pretreatment according to the invention (comparative experiment).

To obtain these curves, about 10 domains each 0.5×0.5 mm were picked out in the cross section of the impregnated strand and cut into a grid of about 46 equal size subdomains. In each subdomain, the fibers contained were counted. The frequency of subdomains having equal numbers of fibers was plotted against the number of fibers per subdomain.

The number 11 for the abscissa value 5 (curve b) means that 11 subdomains each contained 2.5 to 5 fibers. It is seen that pretreatment of the fiber (curve a) results in a more uniform distribution of the fibers than no pretreatment (curve b).

The fiber strands were then impregnated with molten polyphenylene sulfide in a melt pultrusion at a speed of above 3 m/min. The fiber content obtained was 50% by weight±3%.

EXAMPLE 2

Three 1200 tex glass fiber strands having an individual filament diameter of 17 micrometers were pulled at a speed of 3.75 m/min through an aqueous thermoplastic powder dispersion analogously to Example 1. The thermoplastic powder used was a commercial polypropylene with stabilizers in a particle size below 20 micrometers. A nonionic surfactant served as dispersion aid. The solids content of the dispersion was 1.25%. The fiber strands were guided over 5 pins with a total deflection angle of 250 degrees. Sedimenting of the dispersion was prevented by mechanical stirring. Additionally, agglomerates were destroyed using ultrasound. To remove the dispersing medium, each fiber strand was blown off, dried and subjected to the melting on of the powder analogously to Example 1. This resulted in a distinct degree of fiber opening without the action of mechanical forces.

Inlet width of a fiber strand: 3 to 4 mm

Outlet width of a fiber strand: 15 to 17 mm

The fiber strands were subsequently impregnated in a melt pultrusion with molten polypropylene. A fiber content of 50% by weight±2% was achieved.

What is claimed is:

1. A process for producing fiber-reinforced thermoplastic composites with continuous fiber strands, which comprises applying thermoplastic powder in a pretreatment step by pulling the fiber strands through an agitated aqueous thermoplastic powder dispersion via deflectors, removing the dispersing medium, melting the thermoplastic powder onto the fibers, and subsequently applying additional thermoplastic material by impregnating the fiber strands in a melt pultrusion wherein the fiber strands are pulled through a melt of the thermoplastic material.

2. The process of claim 1, wherein more than 90% of the impregnation of the fiber strands is effected by the melt pultrusion.

3. The process of claim 1, wherein the fiber strand is pulled through the aqueous thermoplastic powder dispersion at a speed of at least 3 m/min.

4. The process of claim 1, wherein the thermoplastic powder has a particle size less than 20 micrometers.

5. The process of claim 1, wherein said dispersion is agitated by mechanical means.

6. The process of claim 1, wherein said dispersion is agitated using ultrasound.

7. The process of claim 1, wherein said dispersion is agitated using mechanical stirring and ultrasound.

8. The process of claim 1, wherein said dispersion further comprises a dispersion aid.

9. The process of claim 1, wherein said dispersion comprises a nonionic surfactant.

10. The process of claim 1, wherein said dispersion comprises about 6% by weight of the thermoplastic powder.

11. The process of claim 1, wherein continuous fiber strands comprise filaments having diameters of about 10 micrometers.

12. The process of claim 1, wherein said thermoplastic powder and said thermoplastic material comprise polyphenylene sulfide.

13. The process of claim 1, wherein the thermoplastic powder and the thermoplastic material are the same.

14. The process of claim 1, wherein the step of removing the dispersing medium comprises heating the fiber strands in a drying oven with an airstream to blow off and dry the strands.

15. A process for producing fiber-reinforced thermoplastic composites with continuous fiber strands comprising:

(a) pulling fiber strands through a dispersion of thermoplastic powder in a dispersing medium via deflectors to pre-impregnate the fiber strands and thereby open the fiber strands;

(b) removing the dispersing medium;

(c) melting the pre-impregnated thermoplastic powder onto the fibers; and (d) further impregnating the pre-impregnated fiber strands with a thermoplastic material in a melt pultrusion by pulling the pre-impregnated fiber strands through a melt of the thermoplastic material.

16. The process of claim 15, wherein more than 90% of the impregnation of the fiber strands is affected by the melt pultrusion.

17. The process of claim 15, wherein the fiber strands are pulled through the dispersion of thermoplastic powder at a speed of at least 3 m/min.

18. The process of claim 15, wherein the thermoplastic powder has a particle size less than 20 micrometers.

19. The process of claim 15, wherein the thermoplastic material comprises polyphenylene sulfide.

20. The process of claim 15, wherein the thermoplastic powder and the thermoplastic material are the same.

* * * * *